United States Patent [19]

Crawford et al.

[11] Patent Number: 4,924,977

[45] Date of Patent: May 15, 1990

[54] MULTI-STAGE TORQUE CONVERTER WITH INTEGRATED DAMPER

[75] Inventors: Steven A. Crawford, Dearborn; James R. Wells, Stering Heights, both of Mich.

[73] Assignee: Borg-Warner Automotive, Inc., Troy, Mich.

[21] Appl. No.: 227,351

[22] Filed: Aug. 2, 1988

[51] Int. Cl.⁵ .......................................... F16D 33/00
[52] U.S. Cl. .................... 192/3.28; 192/3.3; 192/3.31; 475/39; 475/43
[58] Field of Search ............... 192/3.21, 3.28, 3.29, 192/3.3, 3.31, 3.33, 30 V, 106.2

[56] References Cited

U.S. PATENT DOCUMENTS

| | | | |
|---|---|---|---|
| 2,190,830 | 2/1940 | Dodge | 60/355 |
| 2,623,411 | 12/1952 | Herndon | 192/3.3 |
| 2,629,266 | 2/1953 | Thurber | 192/3.28 |
| 2,630,993 | 3/1953 | Misch et al. | 192/3.3 |
| 2,632,539 | 3/1953 | Black | 192/3.3 |
| 2,642,168 | 6/1953 | Black et al. | 192/3.26 |
| 2,702,616 | 2/1955 | Black et al. | 192/3.3 |
| 2,737,061 | 3/1956 | Kelley | 74/677 |
| 2,795,152 | 6/1957 | Russell | 74/677 |
| 2,795,153 | 6/1957 | Russell | 74/677 |
| 2,795,154 | 6/1957 | Russell | 74/677 |
| 2,839,950 | 6/1958 | Russell | 74/677 |
| 2,882,751 | 4/1959 | Kelley | 74/677 |
| 3,006,217 | 10/1961 | Dodge | 74/688 |
| 3,010,278 | 11/1961 | Winchell et al. | 60/12 |
| 3,025,719 | 3/1962 | Kelley | 74/677 |
| 3,025,720 | 3/1962 | Kelley | 74/677 |
| 3,189,144 | 6/1965 | Gabriel | 192/3.29 |
| 3,239,037 | 3/1966 | Croswhite et al. | 192/3.3 |
| 3,263,525 | 8/1966 | Jandasek | 74/677 |
| 3,359,830 | 12/1967 | Liang | 74/731 |
| 3,841,094 | 10/1974 | Cobb | 60/339 |
| 3,966,032 | 6/1976 | Koivunen | 192/3.31 |
| 4,004,417 | 1/1977 | Woody et al. | 192/3.31 |
| 4,027,757 | 6/1977 | Radke et al. | 192/3.29 |
| 4,049,093 | 9/1977 | Vukovich et al. | 192/3.3 |
| 4,091,899 | 5/1976 | Stevenson | 192/41 R |
| 4,177,885 | 12/1979 | Ross | 192/3.3 |
| 4,194,604 | 3/1980 | Nichols et al. | 192/3.3 |
| 4,305,487 | 12/1981 | Sunohara | 192/3.28 |
| 4,572,339 | 2/1986 | Koshimo | 192/3.31 |
| 4,580,668 | 4/1986 | Pickard et al. | 192/3.29 |
| 4,720,003 | 1/1988 | Murasugi | 192/3.31 |
| 4,785,923 | 11/1988 | Ushijima | 192/3.3 |

OTHER PUBLICATIONS

E. W. Upton, "Application of Hydrodynamic Drive Units to Passenger Car Automatic Transmissions", SAE Article, Undated.
J. W. Qualman and E. L. Egbert, "Fluid Couplings", SAE Article. Undated.
J. W. Qualman and E. L. Egbert, "New Type of Three-Member Hydrodynamic Unit", SAE Article, Undated.
V. J. Jandasek, "Design of Single-Stage, Three-Element Torque Converter", SAE Article, Undated.
F. H. Walker, "Multiturbine Torque Converters", SAE Article, Undated.

*Primary Examiner*—Rodney H. Bonck
*Assistant Examiner*—Nicholas Whitelaw
*Attorney, Agent, or Firm*—James J. Jennings; Hugh A. Abrams

[57] ABSTRACT

A power transmission system includes a multi-stage torque converter and an integrated vibration damper assembly. The torque converter fluid circuit includes, in series relation, an impeller, circulatory turbine, main turbine, and reaction member or stator. The vibration damper assembly includes an input member, an output hub assembly and a resilient member interposed between. The output hub assembly is operatively connected to the transmission output. A circulator turbine output is drivingly connected to an output shaft through the vibration damper assembly, rather than through the separate circulatory turbine drive plate of a conventional torque converter. In this matter, the vibration damper assembly where a conventional damper assembly would not provide a power output path.

10 Claims, 6 Drawing Sheets

MULTI-STAGE TORQUE CONVERTER WITH INTEGRATED DAMPER

BACKGROUND OF THE INVENTION

1. Field of the Invention

The present invention relates to a torque converter system and, more particularly, to a power transmission system including a multi-stage torque converter with a vibration damper assembly interposed between a circulatory turbine member and the torque converter power output shaft and associated system components.

2. Description of the Prior Art

A variety of torque converter devices have been developed which provide for the transmission of power with the ability to change or multiply torque. The torque converter usually has an impeller, or pump member, which acts as the power input member. A turbine member acts as the output member with a reactor, or stator member, acting for torque multiplication. Typically, the torque converter is either one or two stages, where the number of stages represents the number of turbine elements. In a multi-stage torque converter, a primary or main turbine member will act in conjunction with a secondary or circulatory turbine member and a reactor to provide the desired torque multiplication.

In its conventional form, the single stage torque converter consists of the several members working in a closed fluid circuit. The impeller is rotated by the input power member and pumps fluid into the turbine. The turbine member, which is coupled to the power output shaft, absorbs the energy of the fluid by deflecting and discharging it in a backward direction. The reactor, which is fixed to the casing by a one-way clutch, provides the necessary torque reaction by redirecting the backward flow from the turbine to a forward direction to discharge it into the impeller.

The addition of a secondary turbine member, or circulatory turbine, provides an additional torque multiplication at the lower end of output speed. Typically, the circulatory turbine provides torque multiplication from the stall condition until the condition where the main turbine is running from 0.3 to 0.4 times the speed of the impeller. At that speed, the circulatory turbine blades pass their effective blading angle and thus the main turbine provides the power output and the circulatory turbine, with the provision of a one way clutch, freewheels.

Once the speed of the main turbine has nearly reached the speed of the impeller, i.e., at the high end of output speed, the turbine no longer acts as a multiplier of torque. At that point, the torque converter is typically "locked up" and acts as a direct drive between the torque converter input and output to minimize losses between the input and output from slippage and inefficiency.

In some engine and transmission applications, particularly those utilizing diesel engines, which have extreme conditions of shock and torsional disturbances, a vibrational damper assembly is provided along the driveline. The damper typically provides a means of smoothing out driveline torsional disturbances and objectional gear rattle noises. Where a damper assembly is provided in the torque converter, the damper is used as a lockup mechanism to provide a direct drive. This lockup occurs only at the high end of output speed, generally on the order of 0.8 to 0.9 times engine speed.

As a result of the essentially independent operation of the torque converter members and the damper assembly in such prior art systems, that is, operation of the torque converter members to obtain torque multiplication at the low end and operation of the damper assembly to reduce drive line disturbances at the high end, each unit requires its own independent connections to the power output. The conventional torque converter is drivingly connected to the power output through two separate connections. The main turbine member is drivingly connected to an output shaft by a hub assembly and the circulatory turbine member is separately drivingly connected to an output shaft through an extended plate assembly. Both output shafts are operatively connected to a transmission input through a gear reduction system such as planetary gears. In some prior art assemblies, a damper assembly is interposed between the main turbine element and the output shaft. In most prior art assemblies, a damper assembly is independently drivingly connected to an output shaft through a hub plate.

There has been a need for a torque converter assembly which reduces the number of pieces required for driving connection of the circulatory turbine to the output shaft. Moreover, there is a need for a torque converter assembly which avoids the use of a long, thin plate assembly for connection of the circulatory turbine to the output shaft. Such a plate assembly has failed to provide the optimum control of axial movement of the circulatory turbine with respect to the other members of the toroidal fluid circuit, and results in fluid losses in the toroidal fluid circuit. There has also been a design need for a system having less overall length.

The torque converter with integrated damper assembly of the present invention avoids these shortcomings of the prior art designs and provides the stated desiderata by eliminating the separate connection of the circulatory turbine to the output shaft and controlling the axial movement of the circulatory turbine by utilizing the rigid plates of the damper assembly for its connection.

OBJECTS OF THE INVENTION

It is an object of this invention to provide an improved torque converter system, and particularly to provide a torque converter system which meets the aforenoted needs and avoids the disadvantages and complexities of the prior art.

It is a specific object of this invention to provide a power transmission system that combines a multi-stage torque converter with an integrated damper assembly in a unique way.

It is another object of this invention to provide a multi-stage torque converter which drives a turbine through a vibration damper assembly and eliminates the need for a separate drive plate.

It is a further object of this invention to provide a multi-stage torque converter which utilizes a vibration damper assembly in conjunction with the torque multiplication at the low end of output speed as well as the high end of output speed.

It is another object of this invention to provide an improved multi-stage torque converter which provides greater control over the axial translation of the circulatory turbine while enabling reduction of the overall axial length of the system.

Other objects, advantages and features of the present invention will become apparent upon reading the following detailed description and appended claims, and upon reference to the accompanying drawings.

SUMMARY OF THE INVENTION

In accordance with one embodiment of this invention, a power transmission system which achieves the foregoing objects includes a multi-stage torque converter and a vibration damper assembly. The torque converter fluid circuit includes, in series relation, an impeller, circulatory turbine, main turbine, and reaction member or stator. The impeller, or pump, drives the circulatory turbine and main turbine. Reverse movement of the reaction member is prevented by a one-way clutch.

The vibration damper assembly includes an input member, an output hub assembly and resilient means interposed between the input and output. The output hub assembly is operatively connected to the transmission system output. The input member includes two separate power input means. One power input means is a connection of the damper input to the output of the circulatory turbine member. The second power input means is a connection of a friction member of the damper piston plate, which acts as a friction clutch, to the torque converter cover assembly. The cover assembly thereby acts as a torque transmission means to the input side of the damper.

In this manner, the power output of the circulatory turbine is driven through the damper under certain low end conditions. This provides an operation of the damper assembly at the low end of output speed, that is, at a time other than when the damper assembly piston plate is locked up.

BRIEF DESCRIPTION OF THE DRAWINGS

For a more complete understanding of this invention, one should refer to the preferred embodiment illustrated in greater detail in the accompanying drawings and described below by way of an example of the invention. In the drawings.

DETAILED DESCRIPTION OF THE DRAWINGS

Figure 1:
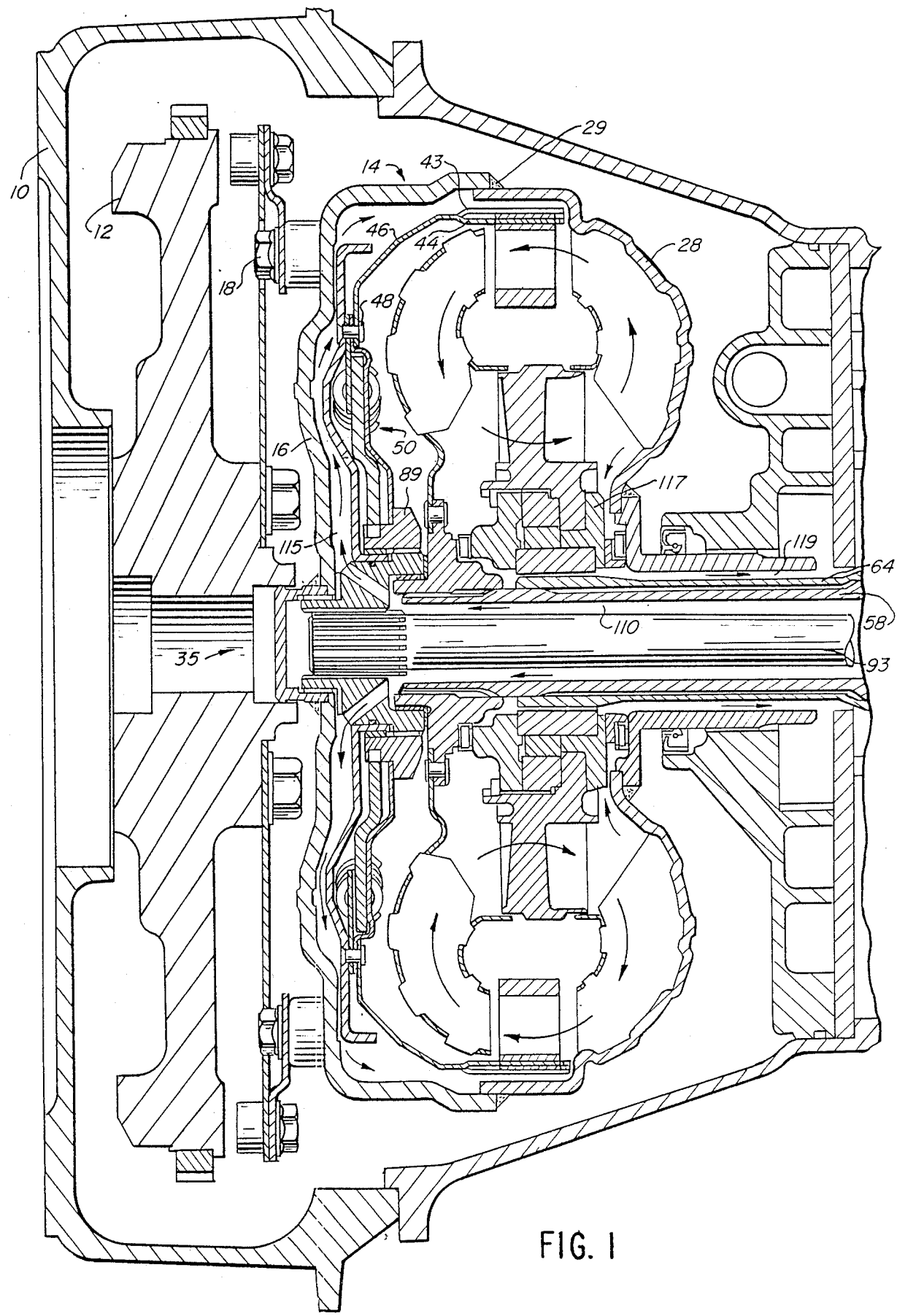
FIG. 1 is a side view of the power transmission system of the present invention, illustrating the multi-stage torque converter and the vibration damper assembly and the output shaft members.
Figure 6:
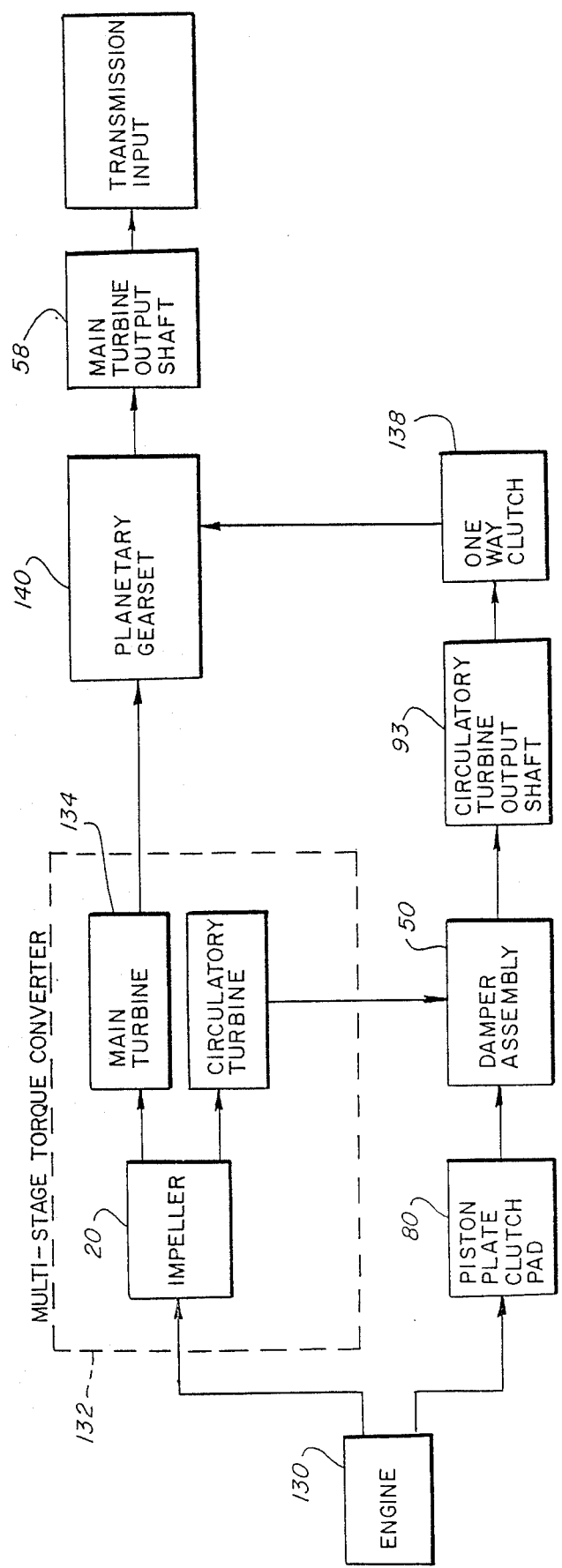
FIG. 6 is a block diagram of the power transmission system from the engine to the transmission input.

Turning now to the drawings, the power transmission system of the present invention is shown in the forward end of the overall transmission in FIG. 1 and in block diagram form in FIG. 6. The transmission housing 10 encloses the flywheel 12 and torque converter, which is shown generally at 14. The torque converter 14 is operatively connected to the flywheel 12 at the outside of converter cover assembly 16. The attachment of the cover assembly 16 to the flywheel 12 is through bolts 18 and lugs, or the like. The bolted connection is such that rotation of the flywheel 12 causes rotation of the cover assembly 16, with the result being the transmission of torque from the flywheel to the cover assembly.

The torque converter comprises a plurality of bladed annular members which together define a toroidal fluid circuit. These members include the impeller member 20, circulatory turbine member 22, main turbine member 24 and reaction member 26. The members of the circuit are relatively rotatable.

Figure 2:
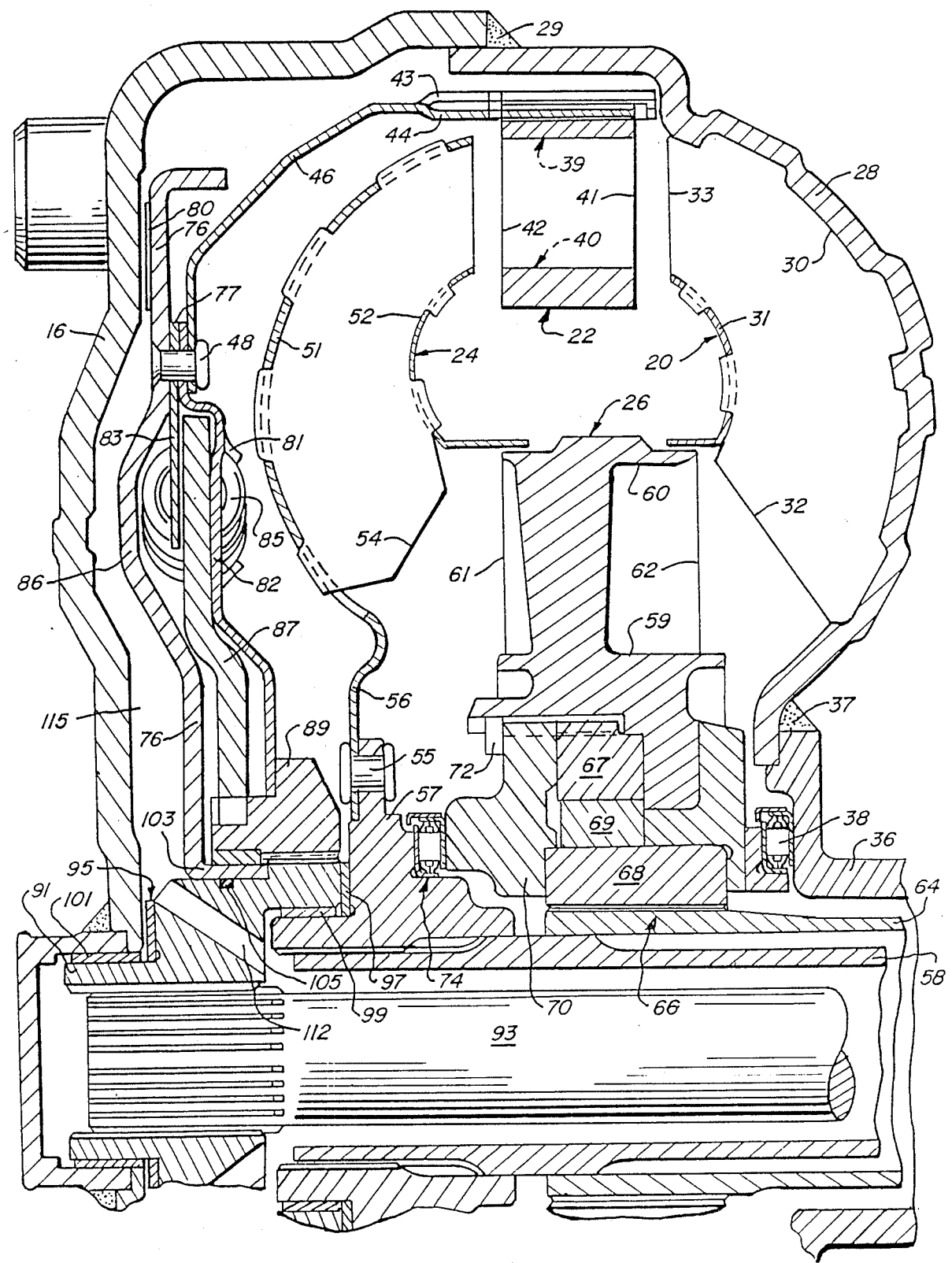
FIG. 2 is a side view of the damper assembly of FIG. 1, illustrating the damper assembly in the unlocked position.
Figure 5:
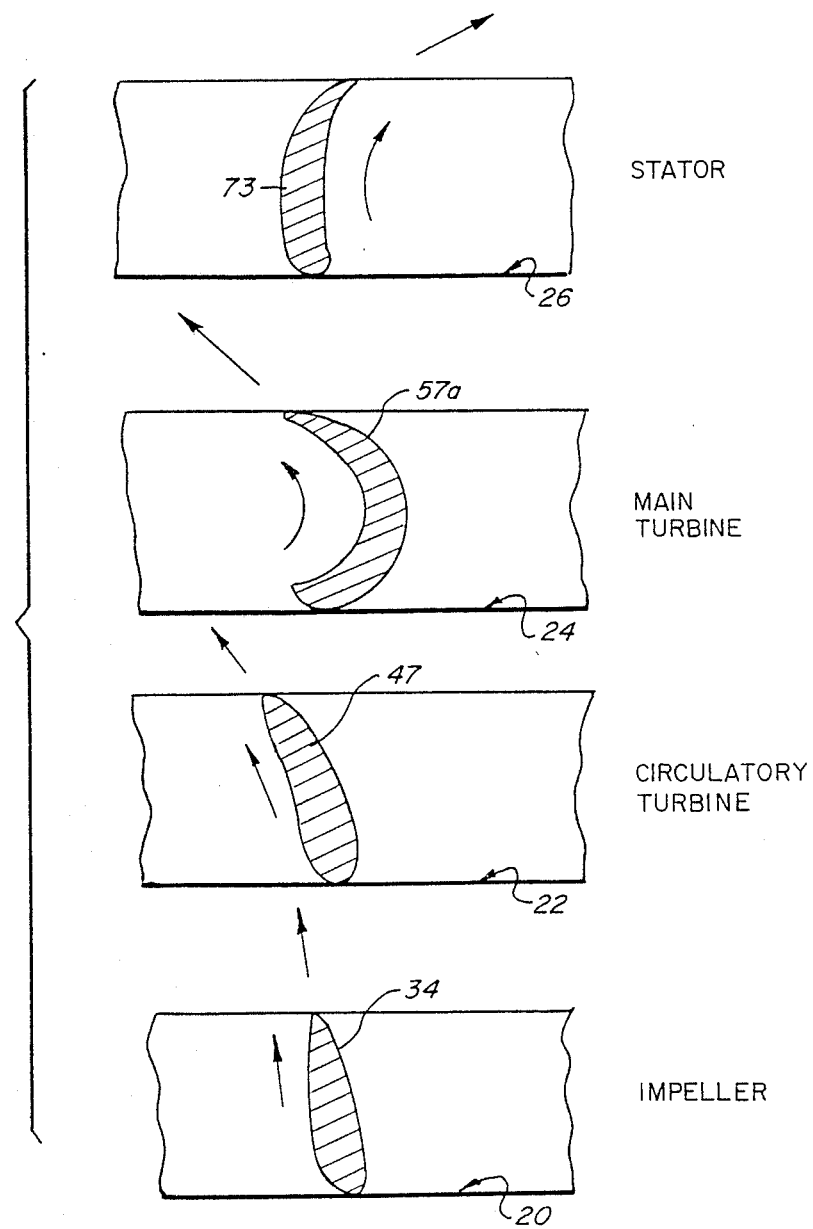
FIG. 5 is a schematic of the elements of the torque converter of FIG. 1, illustrating the angles of the blades of the elements and the direction of fluid flow through the elements.

The impeller member 20 is located at the side of the torque converter which is opposite from the cover assembly 16. The impeller member 20 is formed with an impeller stamping 28. The impeller stamping 28 forms the outside of the torque converter and is connected to the converter cover assembly 16 by welds, such as those shown at 29. The impeller member 20 is an annular member which serves as a pump. The impeller has curved outer walls 30 and curved inner walls 31. The flow of fluid through the impeller is from the inlet 32 to the exit 33. The impeller includes a plurality of spaced blades or vanes 34 extending between the outer walls 30 and inner walls 31. The details of the impeller and other members of the fluid circuit are shown in FIG. 2. The blades of the members of the fluid circuit are shown in the schematic of FIG. 5.

The impeller member 20 is rotated by the action of the cover assembly 16. Rotation of the impeller member 20 forces fluid from the impeller into the first stage of the two turbine stages. In this embodiment, the first stage is the circulatory turbine 22. The impeller member 20 is attached to an impeller hub 36 by welds 37. The impeller hub 36 rotates about the series of center shafts, shown generally at 35. Internal thrust is carried through roller bearing 38. The inlet of the circulatory turbine member 22 is placed downstream from the exit 33 of the impeller in the fluid circuit series. The circulatory turbine 22 has outer walls 39 and inner walls 40. The flow of fluid through the circulatory turbine is from inlet 41 to exit 42. The connection of the circulatory turbine to an output is through forked arms 43, 44, and extension plate 46. Circulatory turbine blades 47 are shown in the schematic of FIG. 5. The extension plate is held in place by rivets 48 which are a part of the damper assembly 50. The damper assembly 50 is described in more detail below.

Rotation of the circulatory turbine 22 forces fluid out the exit 42 and into the second turbine stage. The second turbine stage in this embodiment is the main turbine member 24. Similar to the previously described members of the fluid circuit, the main turbine 24 includes curved outer walls 51 and curved inner walls 52, as well as an inlet 53 and an exit 54. The main turbine is drivingly connected to an output shaft by rivet connections 55 between the main turbine shell stamping 56 and the main turbine hub 57. The main turbine hub 57 has an internally splined central opening (not shown) and is thereby drivingly connected to the main turbine output shaft 58, shown in FIG. 1. The blades 57 of the main turbine are shown in the schematic of FIG. 5.

The fourth element in the fluid circuit is the reaction member 26 or stator. The stator 26 includes outer walls 59, inner walls 60, an inlet 61 and an exit 62. The stator provides the completion of the fluid circuit as the fluid exits the main turbine member and proceeds through the stator into the inlet 32 of the impeller. The stator 26 is connected to the stationary stator shaft 64 through a one way clutch assembly, shown generally at 66. The one way clutch 66 includes an outer race 67, inner race 68 and a roller assembly 69 interposed between. A plastic cap 70 covers the outer race 67, inner race 68 and roller assembly 69 and is held in place by a snap ring 72. The one way clutch assembly 66 prevents reverse rotation of the reaction member. The stator blades 73 are shown in the schematic of FIG. 5.

The main turbine 24 rotates relative to the stator 26 on roller bearings 74. The impeller 20 rotates relative to the stator 26 on roller bearings 38.

As described above, the circulatory turbine 22 is connected through plate 46 to a vibration damper assembly 50. The damper assembly 50 includes a pressure or piston plate 76 and a pair of retaining plates, that is, an inside retaining plate 77 and an outside retaining plate 78. The inside plate 77 is the plate closest to the inside of the piston plate 76. The piston plate 76 includes a friction pad 80 at its upper surface. When the damper assembly 50 is moved into the locked up position, as described more fully below, the friction pad 80 grips the converter cover assembly 16 and provides a means of torque input to the damper assembly 50. The friction pad 80 may comprise a plurality of resilient mounting pads (not shown). In the unlocked position, the piston plate 76 and pad 80 rotate freely of the cover assembly 16.

The retaining plates 77, 78, of the damper assembly 50 are connected to the piston plate by the rivets 48. The outside retaining plate 78 comprises outwardly extending portions 81 and inwardly extending portions 82, at various locations around the circumference of the damper assembly. The inside retaining plate 77 comprises a series of generally downwardly extending portions 83, at various locations around the circumference of the damper assembly.

Figure 4:
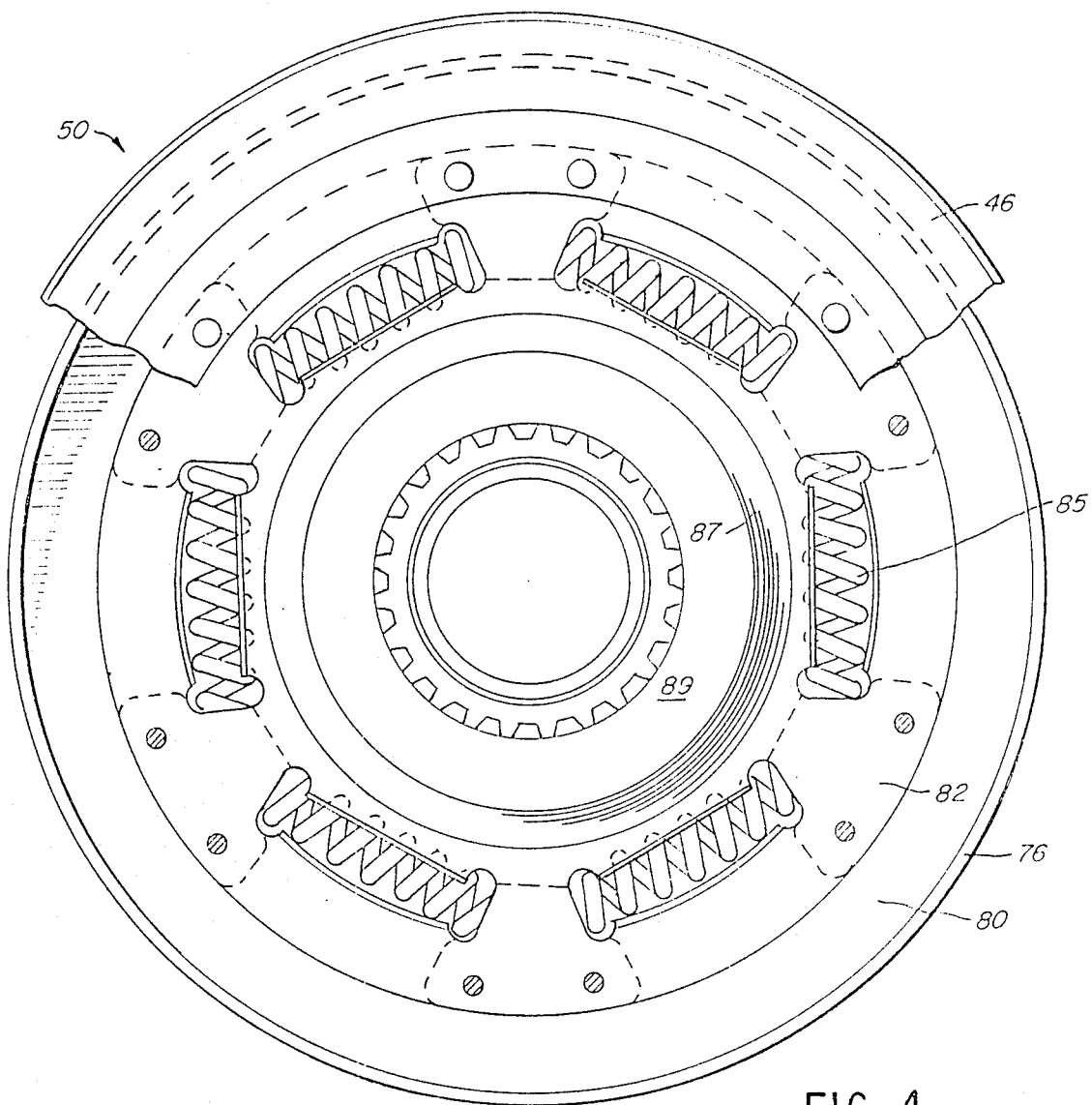
FIG. 4 is a front view of the damper assembly of FIG. 1, illustrating the elements of the assembly and the connection to the circulatory turbine member.

Within the damper assembly 50 are a series of resilient members, or springs 85. As shown more clearly in FIG. 4, the springs 85 are located around the damper. The springs 85 are retained within the damper assembly 50 by a housing assembly formed by the outwardly extending portions 81 of the outside retaining plate 78 and the recessed section 86 of the piston plate 76. The downwardly extending portions of the inside retaining plate 77 are positioned in such a manner and location to provide a driving input to one side of the springs. A damper assembly output is provided by the hub plate 87 which is located on the output side of the springs and fixedly mounted on the hub barrel 89. The piston plate 86 is mounted beneath the hub barrel 89. The barrel 89 is allowed both limited axial and limited rotational movement.

The hub barrel 89 is internally splined (not shown) and positioned on a circulatory turbine hub 91. The circulatory turbine hub 91 is internally splined (not shown) and positioned on the circulatory turbine output shaft 93. In this manner, the damper assembly power output is transmitted from the hub plate 87, through the hub barrel 89 and circulatory turbine hub 91, into the circulatory turbine output shaft 93. A series of thrust washers 95, 97, and bushings 99, 101, are located between the circulatory turbine hub 91 and surrounding parts.

Figure 3:
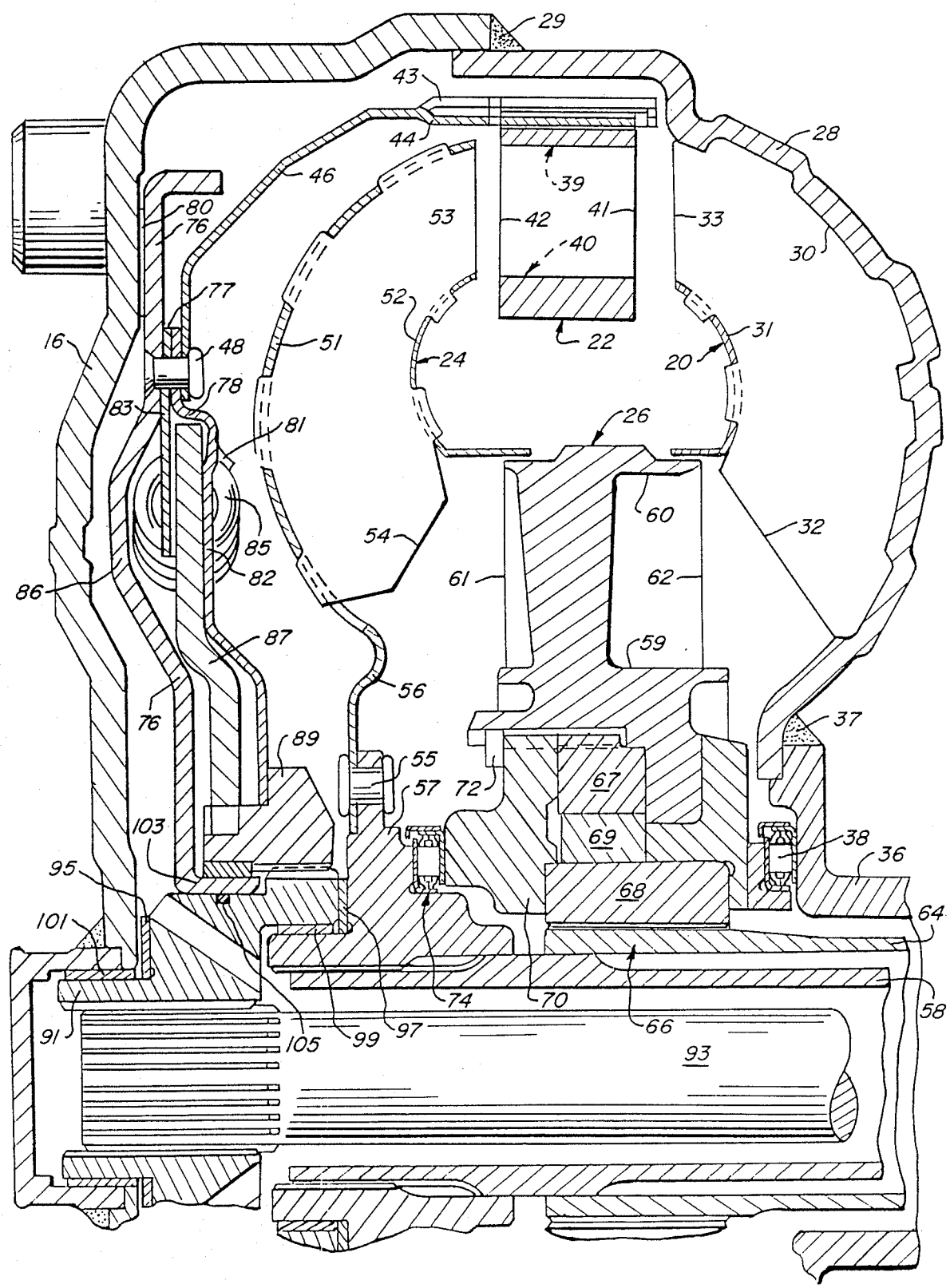
FIG. 3 is a side view of the torque converter and vibration damper assembly of FIG. 1, illustrating the damper in the locked up position.

The piston plate 76 is formed to fit between the hub barrel 89 and the circulatory turbine hub 91 at its edge 103. The edge 103 slides along the top of the circulatory turbine hub 91 in the axial direction. This axial translation of the piston plate 76 moves the piston plate 76 from its locked position with the pad 80 in contact with a machined surface (not shown) on the cover assembly, as shown in FIG. 3, to its unlocked position with the pad 80 allowed to move freely, as shown in FIG. 2. An O-ring 105 is provided between the piston plate 76 and the circulatory turbine hub 91 to form a seal. The total axial movement is very slight, often on the order of 0.02 inch.

As a result of the interconnection of the damper assembly 50 with the circulatory turbine member 22, axial translation of the piston plate results in a substantially proportional axial translation of the circulatory turbine 22. In this manner, excessive axial movement of the circulatory turbine is reduced on account of the tight tolerances and rigid nature of the materials used in the damper assembly system. Such control over the axial movement of the circulatory turbine reduces leakage from the fluid circuit and prevents torque converter power losses.

In operation, power input to the system is provided to cover assembly 16 through flywheel 12. Power output from the system is provided by the main turbine shaft 58, which is drivingly connected to the main turbine member 24, and the circulatory turbine output shaft 93, which is drivingly connected to the circulatory turbine 22 through the damper assembly 50. Additionally, power output through the circulatory turbine output shaft 93 occurs when the damper assembly 50 is in the locked up position with the cover assembly 16. As shown in FIG. 1, the circulatory turbine output shaft 93 is journalled within the main turbine shaft 58, which is journalled within the stator shaft 64.

During the starting or stall condition of operation, the impeller 20 will deliver fluid to the circulatory turbine 22 and will rotate the latter at increasing speed. Rotation of the circulatory turbine 22 will provide an output to circulatory turbine output shaft through damper assembly 50. The engagement of the retaining plates 77, 78 against one end of the springs 85 will cause compression of the spring sets. Torque is transferred through the spring sets and out the hub plate 87 and hub barrel 89 to circulatory turbine shaft 93.

In this starting condition, the damper assembly 50 is in the unlocked position with the friction pad 80 of piston plate 76 not engaging the cover assembly 16. In this same condition, the circulatory turbine 22 will rotate in the same direction as the impeller and will discharge fluid into the main turbine 24. The input of fluid into the main turbine 24 will begin rotation of the latter at an increasing speed.

The speed of the circulatory turbine generally increases until it reaches 0.3 to 0.4 times the speed of the impeller. At this speed, the circulatory turbine passes its effective blading angle and essentially freewheels, no longer providing substantially all of the torque output. In the same manner, the speed of the main turbine generally increases until it reaches 0.8 to 0.9 times the speed of the impeller. At this speed, the torque converter is by-passed by the lockup of the vibration damper assembly 50.

During this period of operation, from stall condition to torque converter by-pass or lockup, driving fluid travels along the output shaft 93 in passage 110. The fluid travels through the circulatory turbine hub 91 through passage 112 and behind the damper piston plate 76 in passage 115. The fluid passes through the torque converter toroidal fluid circuit, as described above, and exits the system through output passages 117 and 119.

When the torque converter and damper system has reached the lockup condition, at the high end of output speed, the damper assembly moves to the locked up position of FIG. 3. In this position, the friction pad 80 of piston plate 76 contacts the cover assembly 16 under fluid pressure. During this period of operation, the power output is directly from the cover assembly 16, through the damper assembly 50, to the output shaft 93, and avoids travel through the torque converter fluid circuit. The damper assembly 50 provides a means to reduce disturbances in the driveline.

A block diagram schematic of this operation system is shown in FIG. 6. The output of the engine 130 enters the torque converter 132, which has a main turbine output 134 and circulatory turbine output 136. The circulatory turbine output 136 is controlled by a one way clutch 138 to the output of a 3:1 planetary gear set 140. As the circulatory turbine output shaft reaches 0.3 to 0.4 times impeller speed, the one way clutch 138 allows freewheeling of the circulatory turbine. The main turbine output 134 provides the output torque from about the output speed of 0.3 to 0.4 times engine speed, up to about 0.8 to 0.9 times engine speed. At that speed, the piston plate is actuated.

At a preset speed equal to or somewhat less than the predetermined speed for piston plate actuation, a control mechanism actuates the planetary gear set 140 to provide direct drive, that is 1:1 output, from the circulatory turbine output shaft to the main turbine output shaft. Such control means is well known as thus shown only in block form in FIG. 6. As the circulatory turbine output shaft is free wheeling for main turbine output shaft speeds from about 0.3 to 0.4 of engine speed up to about 0.8 or higher times engine speed, the planetary gear shifting may occur anywhere within this range.

Thus, a torque converter with integrated damper assembly has been provided which meets the aforestated objects. At stall condition, the circulatory turbine output is drivingly connected to an output shaft through a vibration damper assembly, rather than through the separate circulatory turbine drive plate of a conventional torque converter. In this manner, the vibration damper assembly provides a function at the low end of output speed where a conventional damper assembly would not be operated. Additionally, the use of the damper assembly for this function provides a greater control over the axial translation of the circulatory turbine member in the torque converter. The damper also performs its known function in the lockup and driving phase.

While one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:
1. A power transmission system comprising,
a plurality of bladed annular means defining a toroidal fluid circuit including
impeller means, main turbine means, circulatory turbine means, and reactor means in a series relationship in said fluid circuit and said reactor means being fixed against reverse rotation;
power input means operatively coupled to said impeller means;
first power output means operatively coupled to said main turbine means;
second power output means coupled to said first power output means through a gearset means; and,
a vibration damper assembly comprising damper input means fixedly connected to said circulatory turbine means, damper output means operatively connected to said second power output means, resilient means interposed between said damper input means and said damper output means to provide a resilient driving connection therebetween, and clutch means for selectively connecting said damper input means to said power input means at speeds above a predetermined speed.

2. The power transmission system of claim 1 wherein said second power output means is by-passed to form a transmission power outlet means from said first power output means at a preset speed no greater than said predetermined speed.

3. The power transmission system of claim 2 wherein said second power output means includes an overrunning clutch whereby said circulatory turbine means provides a transmission power outlet means only below a shifting speed substantially below said preset speed.

4. The power transmission system of claim 1 wherein said bladed annular means and said damper assembly and said clutch means are within a common fluid-tight enclosure.

5. The power transmission system of claim 4 wherein the fluid pressure generated by said fluid circuit is utilized to generate a fluid pressure for actuating said clutch means.

6. A power transmission system comprising,
a plurality of bladed annular members defining a toroidal fluid circuit, said circuit including an impeller member, a circulatory turbine member, a main turbine member, and a reaction member in a series relation in said fluid circuit, said impeller member, said main turbine member and said circulatory turbine member being relatively rotatable, said reaction member operatively restricted against reverse rotation;
power input means operatively connected to said impeller member;
first power output means operatively connected to said main turbine member; and,
second power output means operatively connected to said circulatory turbine member, said second power output means comprising a vibration damper assembly, said assembly including a damper input member, an output hub assembly operatively connected to a power output shaft member, resilient means interposed between said damper input member and said hub assembly to provide a resilient driving connection therebetween, said damper input member fixedly connected to said circulatory turbine member, said first and second power output means being operatively coupled to form a transmission power outlet means.

7. The vibration damper assembly of claim 6 wherein said damper input member includes first and second power input means; said first damper power input means comprising said damper input member connected to said circulatory turbine member; and, said second damper power input means comprising a piston plate, said piston plate adapted to engage a torque input means.

8. The vibration damper assembly of claim 7 wherein said piston plate being supported upon a turbine hub member; and, said turbine hub member being axially translatable to permit engagement of said piston plate with said torque input means.

9. The power transmission system of claim 8 wherein axial movement of said circulatory turbine member within the toroidal fluid circuit is substantially controlled by said axial translation of said turbine hub member.

10. A power transmission system comprising,
- a plurality of bladed annular members defining a toroidal fluid circuit, said circuit including an impeller member, a circulatory turbine member, a main turbine member, and a reaction member in a series relation in said fluid circuit, said impeller member, said turbine member and said circulatory turbine member being relatively rotatable, said reaction member operatively restricted against reverse rotation;
- power input means operatively connected to said impeller member;
- first power output means operatively connected to said main turbine member; and,
- second power output means operatively connected to said circulatory turbine member, said second power output means comprising a vibration damper assembly, said assembly including
- a damper input pressure plate member,
- first and second retainer plates, each of said plates operatively connected to said input member, one of said retainer plates being oppositely oriented with said piston plate to form a housing therebetween,
- resilient means within said housing,
- a hub assembly including a plurality of radially extending arms adapted to engage one end of said resilient means,
- the other of said retaining plates having integral drive means interposed in the path of the other end of said resilient means,
- said hub assembly operatively connected to a power output shaft member,
- said pressure plate fixedly connected to said circulatory turbine member, said first and second power output means being operatively coupled to form a transmission power outlet means.

* * * * *